United States Patent

Mueller, Jr. et al.

[15] 3,687,916

[45] Aug. 29, 1972

[54] ORGANOALUMINUM COMPOUNDS AS ADJUVANTS IN AN ORGANOCALCIUM INITIATED POLYMERIZATION OF CONJUGATED DIENES AND/OR MONOVINYL AROMATIC COMPOUNDS

[72] Inventors: Francis X. Mueller, Jr., Louisville, Ky.; James D. Brown, Bartlesville, Okla.

[73] Assignee: Phillips Petroleum Company

[22] Filed: Dec. 16, 1968

[21] Appl. No.: 784,201

[52] U.S. Cl..........260/83.7, 252/431 R, 260/93.5 S, 260/94.2 R, 260/665 R
[51] Int. Cl. ........C08d 3/06, C08d 1/32, C08f 19/08
[58] Field of Search................260/93.5 S, 94.2, 665; 252/431

[56] References Cited

UNITED STATES PATENTS

| | | | |
|---|---|---|---|
| 2,908,673 | 10/1959 | Jackson | 260/94.2 |
| 2,935,542 | 5/1960 | Minckler et al. | 252/431 |
| 3,163,630 | 12/1964 | Pampus et al. | 260/94.2 |
| 3,509,067 | 4/1970 | Bostick | 260/93.5 |
| 3,526,604 | 9/1970 | Wadsworth | 260/94.2 |

*Primary Examiner*—James A. Seidleck
*Attorney*—Young and Quigg

[57] ABSTRACT

Polymers are produced from conjugated dienes and monovinyl-substituted aromatic compounds by employing a polymerization initiator system of an organoaluminum adjuvant and an organocalcium initiator so as to unexpectedly improve and control the polymerization process.

5 Claims, No Drawings

ORGANOALUMINUM COMPOUNDS AS ADJUVANTS IN AN ORGANOCALCIUM INITIATED POLYMERIZATION OF CONJUGATED DIENES AND/OR MONOVINYL AROMATIC COMPOUNDS

This invention relates to a process for polymerizing conjugated dienes and monovinyl-substituted aromatic compounds.

It has now been discovered that a polymerization initiator comprising an organocalcium compound and an organoaluminum adjuvant are surprisingly effective for the polymerization initiation of conjugated dienes and monovinyl-substituted aromatic compounds. It has been further discovered that the organocalcium compound and organoaluminum adjuvant function together to improve the polymerization process and that the use of a combination of these two components makes it possible to use lower catalyst levels than could otherwise be employed. The initiator system further provides a means for controlling the molecular weight of a polymer initiated therewith.

It is an object of this invention to provide a new process for the polymerization of conjugated dienes, monovinyl-substituted aromatic compounds, and mixtures of any two or more of these compounds.

It is another object of this invention to provide a polymerization process wherein modification of the polymerization initiator system provides a means for controlling the molecular weight of the polymer produced. Other objects, advantages, and features of our invention will be apparent to those skilled in the art from the disclosure and discussion herein set forth.

According to our invention, if an organoaluminum compound is employed as an adjuvant in conjunction with an organocalcium compound as a polymerization initiator system for the polymerization of conjugated dienes, monovinyl substituted aromatic compounds, and mixtures of any two or more of these compounds, much higher conversion rates and also much higher conversions are achieved than when either component is used singly.

Organocalcium compounds suitable for employment in our invention include the reaction products obtained by reacting elemental calcium and a polynuclear aromatic compound or a polyaryl-substituted ethylene.

Those polynuclear aromatic compounds employed for producing the organocalcium compound comprise aromatic hydrocarbons containing at least a 3-ring structure in which at least two of said rings are aromatic and at least two of said rings are fused and said polynuclear aromatic hydrocarbon comprises from 12 to 40 carbon atoms per molecule. These polynuclear aromatic hydrocarbons can contain alkyl, cycloalkyl, aryl, alkoxy, aryloxy, alkylthiol, arylthiol, and N,N-dialkylamino substituents and combinations thereof such as cycloalkylalkyl, aryalkyl, and the like, wherein the total carbon atoms of all of the substituents total not more than 25. Exemplary of these compounds are anthracene; 9,10-dimethylanthracene; 9,10-diphenylanthracene; phenanthrene; 9,10-benzophenanthrene; 2,3-benzanthracene; 1,2-benzanthracene; chrysene; acenaphthylene; perylene; fluoranthene; 3-(3-ethylcyclohexyl)anthracene; 4-(2-cyclohexylethyl)tetracene; 4,7-diethoxyfluoranthene; 1-phenoxy-6-methylcoronene; 6-(ethylthio)aceanthrylene; 6,8-di(phenylthio)hexacene; 7-(N,N-diethylamino)acephenanthrylene; 3,8,14-(triphenoxy)trinaphthylene; 1,3,6,8-(tetraphenylthio)pyrene; 1,15-dipentylpyranthrene; 4-N,N-(dimethylamino)-perylene; heptaphene; heptacene; pentaphene; rubicene; pleiadene; pentacene; 1,4,8,11-(tetracyclohexyl)pentacene; 9-methylanthracene; 9-phenylanthracene; 9,10-dicyclohexylanthracene; or 9,10-di(N,N-dimethylamino)anthracene, and the like.

Those polyaryl-substituted ethylene compounds employable for forming the organic portion of the organocalcium compound consist of ethylene that has been substituted with at least two aryl radicals and said polyaryl-substituted ethylene contains from 14 to 40 carbon atoms per molecule. The said aryl substituents can contain alkyl, cycloalkyl, aryl, alkoxy, aryloxy, alkylthiol, arylthiol, or N,N-dialkylamino radicals and combinations thereof such as cycloalkylalkyl, aryalkyl, and the like, wherein the total carbon atoms of all of these latter radicals total not more than 25. Exemplary of these compounds are cis and trans 1,2-diphenylethylene (stilbene); 1,1-diphenylethylene; triphenylethylene; tetraphenylethylene; triphenylethylene; 1-phenyl-2-(1-naphthyl)ethylene; 1,1-diphenyl-2-(2-naphthyl)ethylene; 1,2-di(1-naphthyl)ethylene; 1-(4-methoxyphenyl)-1-(4-phenoxyphenyl)-2-[4-(3-methylcyclopentyl)phenyl]-2-(4-cyclohexylmethylphenyl)ethylene; 1-(4-methylthiophenyl)-1-(4-phenylthiophenyl)-2-[4-(N,N-diethylamino)phenyl]-ethylene; tetra-(4-phenoxyphenyl)ethylene; tetra-(1-naphthyl)ethylene, and the like.

Any method known to the art can be employed for preparing the organocalcium compounds of this invention. One method generally preferred comprises contacting substantially pure elemental calcium in the form of turnings or shot, or the like, so as to provide a form of calcium with as much exposed surface area as possible, with the polynuclear aromatic compound or the polyaryl-substituted ethylene. It is important that the calcium be protected from air and maintained accordingly so as to prevent the formation of oxides thereon.

The polynuclear aromatic compound, or the polyaryl-substituted ethylene and the elemental calcium are brought together at a temperature in the range of about −100° to 200° F, preferably about −20° to 125° F. The contacting is carried out generally in the presence of an ethereal diluent of mono- or polyethers including acyclic and cyclic ethers. Alkyl, aryl, or cycloalkyl ethers, or combinations thereof, containing 2 to 20 carbon atoms per molecule and about one to four ether groups per molecule can be employed. Exemplary ethers are diethyl ether, dibutyl ether, methyl butyl ether, phenyl methyl ether, diphenyl ether, cyclohexyl methyl ether, tetrahydrofuran, 1,2-dimethoxyethane, 1,4-dioxane, and the like. Tetrahydrofuran; 1,2-dimethoxyethane; or 1,4-dioxane are the preferred diluent ethers.

When preparing the organocalcium compound herein described, it is believed likely that the ethereal diluents form ether complexes with the organocalcium initiator thus formed.

When a very finely divided metal form is employed, such as produced by the vaporization of calcium in an electric furnace, as described by V. Sinn, B. Francois, N. Mayer, and J. Parrod in *Compt. Rend.* (Paris), 262, Ser. C, p 541–544 (1966); it is unnecessary to contact the organic compounds with the calcium in the presence of ether diluents. The contacting can then be carried out generally in any inert diluent such as aliphatic, aromatic, cycloaliphatic, or araliphatic hydrocarbons and the like.

Employment of the vaporized metal is not the preferred procedure due to the more costly and more complex electric furnace procedures used for the preparation of such a very finely divided metal.

Metals that have been prepared by such a method often possess polymerization initiator activity themselves, but are, however, generally inferior to the initiators of this invention. The solution or suspensions of the initiators produced according to this invention are more easily handled in charging, measuring, or other transfer operations than the vaporized metals themselves. This subsequently results in improved control of the polymerization reaction in terms of initiator level and thus the molecular weight of the polymer.

The ratio of gram atoms of calcium to mole of polynuclear aromatic compound, or to mole of polyaryl-substituted ethylene, is in the range of about 1:1 to 25:1. It is preferred to use an amount of calcium in excess of the 1:1 ratio with a more preferred ratio being 4:1 to 15:1.

Organic promoters which react immediately to expose fresh calcium surface metal can also be employed during the preparation of the organocalcium initiator. Alkyl or alkylene halogen-containing promoters such as 1,2-dibromoethane, methyl iodide, ethyl bromide, or ethyl iodide, and the like, function accordingly. The well-known Grignard reaction utilizes such a promoter and is described in *Organo-Metallic Compounds* by G. E. Coates, pages 46–47, 2nd Ed., John Wiley & Sons, Inc., New York (1960).

The amount of promoter, if employed, is generally in the range of about 0.002 to 0.2 mole, preferably about 0.005 to 0.1 mole, per gram atom of calcium, and preferably containing the bromide or iodide halogen with 1,2-dibromoethane being the preferred promoter for use with this invention.

The organoaluminum compounds employed in the polymerization initiator system of this invention can be represented by the formula $R_3Al$ where R is a saturated aliphatic, saturated cycloaliphatic, or an aromatic radical or combination thereof such as aliphaticaromatic, and the like, containing from 1 to 20 carbon atoms. Exemplary of these compounds include trimethylaluminum, triethylaluminum, tri-n-propylaluminum, triisopropylaluminum, tri-n-butylaluminum, tri(2-methylbutyl)aluminum, tri-n-octylaluminum, tri-n-dodecylaluminum, tricyclohexylaluminum, triphenylaluminum, tribenzylaluminum, trieicosylaluminum, diethyl-n-butylaluminum, tri-4-tolylaluminum, tri(2-hexyltetradecyl)aluminum, methyl-di-(4-cyclohexyloctyl)aluminum, ethyl-di-(2-butylcyclohexyl)aluminum, tri(2,4,8-trimethylhendecyl)aluminum, and the like.

The mole ratio of the organocalcium initiator compound to the organoaluminum adjuvant will depend to some extent upon the catalyst level desired but will generally be in the range of 0.2:1 to 15:1, with the preferred range of about 0.3:1 to 10:1.

As hereinbefore stated, the polymerization initiator system of this invention can be employed for the polymerization of conjugated dienes, monovinyl-substituted aromatic compounds, and mixtures of any two or more of these monomers. Random and block copolymers of these monomers can be prepared.

The polymerization initiator system of this invention is particularly useful in the polymerization of those conjugated dienes containing from four to 12 carbon atoms per molecule and preferably four to eight carbons per molecule. Exemplary of these compounds are 1,3-butadiene; isoprene; 2,3-dimethyl-1,3-butadiene; 1,3-pentadiene; 1,3-hexadiene; 4,5-diethyl-1,3-octadiene; 2-phenyl-1,3-butadiene; 3-methyl-1,3-heptadiene and the like. Exemplary examples of those monovinyl-substituted aromatic hydrocarbons suitable for employment in this invention are styrene; 4-ethylstyrene; 4-dodecylstyrene; alpha-methylstyrene; 1-vinylnaphthalene; 2-vinylnaphthalene; 9-vinylanthracene; 3-vinylphenanthrene; 2-alpha-methylvinylnaphthalene and the like.

The polymerization reaction can be conducted according to general methods and conditions known to the art. The reaction is generally conducted, in a hydrocarbon diluent, i.e., paraffinic, cycloparaffinic, or aromatic hydrocarbons, containing from four to ten carbon atoms per molecule, and polymerization temperatures in the range of $=100°$ to $200°$ F are generally employed. Higher and lower temperatures can be employed, if desired. Temperatures in the range of $=20°$ to $122°$ F are preferred. The concentration of the organocalcium compound employed is about 1.1 to 100 gram millimoles per 100 grams of monomer(s) (mhm) and preferably about 2 to 20 (mhm).

The products prepared in accordance with the invention range from low molecular weight materials to rubbers and plastics, depending upon the monomers employed, catalyst level, and the like. The elastomeric polymers can be compounded with vulcanizing agents, fillers, antioxidants, plasticizers, extender oils, and the like. The products can be used for various types of applications such as shoe soles, floor tile, tubing, tire stock, and various molded objects, and as blending stocks for rubbers and plastics, and the like.

Illustrative of our invention and not to be interpreted as a limitation upon the materials herein employed or upon the general scope of this invention, the following examples are presented.

EXAMPLE I

According to a preferred embodiment of our invention, the organocalcium compound was prepared employing the following formula and technique:

| | |
|---|---|
| Anthracene, mole | 0.025 |
| Ca, 6 mesh shot, g. atom | 0.10 |
| 1,2-Dibromoethane, mole | 0.001 |
| Tetrahydrofuran, ml | 100 |
| Temperature | 122°F |
| Time, hours | 144 |

The anthracene was charged to the reactor first followed by the calcium and then the tetrahydrofuran. The reactor was flushed with argon and 1,2-dibromoethane was added. The temperature was adjusted to 122° F and maintained at this level for 144 hours. The calcium-anthracene reaction product precipitated as it was formed. The mixture was centrifuged, the tetrahydrofuran was withdrawn, and the solid product was washed (stirred) with 100 ml of toluene at 122° F for 30 minutes. The mixture was centrifuged, toluene withdrawn, and washing was repeated. After the second washing and removal of toluene, the insoluble reaction product was dispersed in 100 ml of toluene. The alkalinity of this dispersion was determined by titration of a hydrolyzed portion with 0.1 N HCl. The molarity was found to be 0.105. The calcium-anthracene reaction product was then employed with an organoaluminum compound as the polymerization initiator system for polymerizing styrene according to the following recipe:

| | |
|---|---|
| Toluene, parts by weight | 870 |
| Styrene, parts by weight | 100 |
| Calcium-anthracene reaction product (Ca-An) mhm | variable |
| Triisobutylaluminum, (TBA) mhm | variable |
| Temperature, °F | 122 |
| Time, hours | 24 | mhm = gram millimoles per 100 grams monomer.

The toluene was charged first and the reactor was purged with nitrogen and then closed and pressured with argon to 20 psig. Styrene was introduced followed by the calcium-anthracene reaction product (when used) and then the triisobutylaluminum (when used). The polymerization reaction was terminated with isopropyl alcohol. The polymer was coagulated is isopropyl alcohol and then separated. The coagulation liquid was evaporated to recover additional polymer. The total polymeric material was dried under vacuum at 60° C. Solid products were obtained. The amounts of catalyst components, conversion, inherent viscosity of the polymer are reported in Table I. The above example demonstrates the unexpected effects achieved by employing the organocalcium initiator component and the organoaluminum adjuvant as a combination in a polymerization initiator system. Run 3 particularly exemplifies the unexpected effect of these two components in that 97 percent conversion was achieved when the total concentration of these components was equal to the total initiator concentration of Run 1 and Run 4 where each of the components was used singly, and comparatively lower conversion obtained. These data also show that the organoaluminum adjuvant had a modifying effect on the polymerization as evidenced by the decrease in the viscosity of the polymer in Runs 1–3.

TABLE I

| Run No. | Ca-An, mhm | TBA, mhm | Ca-An:TBA Mole Ratio | Conv., % | Inherent viscosity |
|---|---|---|---|---|---|
| 1 | 8.0 | 0 | — | 54 | 0.50 |
| 2 | 7.0 | 1.0 | 7:1 | 98 | 0.34 |
| 3 | 4.0 | 4.0 | 1:1 | 97 | 0.26 |
| 4 | 0 | 8.0 | — | 2 | — |

EXAMPLE II

The modifying effect of triisobutylaluminum on the polymerization of butadiene using a calcium-anthracene reaction product as the catalyst was determined. The amount of the organocalcium component was held constant while the triisobutylaluminum was varied. The polymerization recipe was as follows:

| | |
|---|---|
| Cyclohexane, parts by weight | 780 |
| 1,3-Butadiene, parts by weight | 100 |
| Calcium-anthracene reaction product, (Ca-An) mhm | 3.6 |
| Triisobutylaluminum, (TBA)mhm | variable |
| Temperature, °F | 122 |
| Time, hours | 21 |

The calcium-anthracene reaction product was prepared and analyzed as described in Example I. The molarity of the dispersion was 0.120.

When conducting the polymerization the cyclohexane was charged first and the reactor was then purged with nitrogen. Butadiene was added followed by the calcium anthracene reaction product and then the triisobutylaluminum. The temperature was adjusted to 122° F and maintained at this level throughout the polymerization. At the end of the reaction period at 10 weight percent solution of the antioxidant, 2,2'-methylene-bis(4-methyl-6-tert-butylphenol), in isopropyl alcohol with the amount added being sufficient to provide about 1 part by weight of the antioxidant per 100 parts by weight of the polymer. The polymer was coagulated in isopropyl alcohol, separated, and dried. The amount of triisobutylaluminum employed in each run, conversion, inherent viscosity, gel, and microstructure of the polymers are shown in Table II.

TABLE II

| run no. | TBA, mhm | Ca-An:TBA, Mole Ratio | cov., % | inh. Visc. | gel, % | Microstructure, % cis | vinyl | trans |
|---|---|---|---|---|---|---|---|---|
| 1 | 0 | — | 100 | 1.58 | 0 | 8.1 | 9.2 | 82.7 |
| 2 | 0.5 | 7.2:1 | 98 | 1.36 | 0 | 9.5 | 8.0 | 82.5 |
| 3 | 1.0 | 3.6:1 | 96 | 1.27 | 0 | 8.9 | 7.5 | 83.6 |
| 4 | 2.0 | 1.8:1 | 96 | 1.23 | 0 | not det'd. | | |
| 5 | 4.0 | 0.9:1 | 97 | 1.04 | 0 | 9.8 | 7.4 | 82.8 |
| 6 | 6.0 | 0.6:1 | 97 | 0.91 | 0 | not det'd | | |
| 7 | 8.0 | 0.45:1 | 98 | 0.79 | 0 | not det'd. | | |
| 8 | 10.0 | 0.36:1 | 100 | 0.62 | 0 | 6.6 | 6.7 | 86.7 |

These data demonstrate the modifying effect of the triisobutylaluminum on the polymerization of butadiene as evidence by the decrease in inherent viscosity of the polymers as the amount of triisobutylaluminum was increased. All conversions were essentially quantitative and all polymers contained more than 80 percent trans configuration.

EXAMPLE III

A series of runs was made for the polymerization of butadiene using variable amounts of a calcium-anthracene reaction product and triisobutylaluminum. In each run 780 parts by weight of cyclohexane and 100 parts by weight of 1,3-butadiene were employed. The calcium-anthracene reaction product was prepared and analyzed as in Example I. The molarity of the dispersion was 0.115. The procedure was the same as described in Example II. The polymerization time was 20 hours. Results are presented in Table III.

TABLE III

| run no. | Ca-An, mhm | TBA, mhm | Ca-An-TBA, Mole Ratio | conv., % | inh. visc. | gel, % | Microstructure, % cis | vinyl | trans |
|---|---|---|---|---|---|---|---|---|---|

| | | | | | | | | | |
|---|---|---|---|---|---|---|---|---|---|
| 1 | 0 | 4.0 | — | 1 | — | — | — | — | — |
| 2 | 1.15 | 4.0 | 0.29:1 | 31 | 0.92 | 0 | 8.8 | 6.8 | 84.4 |
| 3 | 1.72 | 4.0 | 0.43:1 | 98 | 1.37 | 0 | 11.4 | 6.9 | 81.7 |
| 4 | 2.30 | 4.0 | 0.58:1 | 97 | 1.19 | 0 | not det'd. | | |
| 5 | 2.88 | 4.0 | 0.72:1 | 98 | 1.16 | 0 | 10.4 | 7.3 | 82.3 |
| 6 | 3.45 | 4.0 | 0.86:1 | 97 | 1.11 | 0 | not det'd. | | |
| 7 | 4.03 | 4.0 | 1.01:1 | 98 | 1.05 | 0 | 8.6 | 7.3 | 84.1 |

These data show that triisobutylaluminum alone showed little polymerization initiation of butadiene. However, polymerization did occur at relatively low levels when the calcium-anthracene reaction product and triisobutylaluminum were present.

As will be evident to those skilled in the art, various modifications of this invention can be made, or followed, in light of the teaching and discussion set forth herein without departing from the scope and spirit of our invention.

We claim:

1. The polymerization process comprising reacting under polymerization conditions at a temperature of about −100° F. to +200° F. a polymerizable conjugated diene of four to 12 carbon atoms per molecule, a polymerizable monovinyl-substituted aromatic compound, or a mixture thereof, in the presence of a hydrocarbon diluent, with a polymerization initiator system comprising an organocalcium reaction product and an organoaluminum compound, wherein said organocalcium reaction product is a product formed by reaction of substantially pure elemental calcium with a polynuclear aromatic compound of 12 to 40 carbon atoms per molecule or with a polyaryl-substituted ethylene of 14 to 40 carbon atoms per molecule, wherein said reaction is conducted in the presence of an ethereal diluent and employs a ratio of gram atoms of said calcium to mole of said polynuclear aromatic compound or of said polyaryl-substituted ethylene of about 1:1 to 25:1, said polynuclear aromatic compound is an aromatic hydrocarbon containing at least a three-ring structure in which at least two of said rings are aromatic and at least two of said rings are fused and said polynuclear aromatic hydrocarbon can contain alkyl, cycloalkyl, aryl, alkoxy, aryloxy, alkylthiol, arylthiol, or N,N-dialkylamino substituents, and combinations thereof, wherein the carbon atoms of all of the substituents total not more than 25;

said polyaryl-substituted ethylene is ethylene that has been substituted with at least two aryl radicals and said aryl substituents can contain alkyl, cycloalkyl, aryl, alkoxy, aryloxy, alkylthiol, arylthiol, or N,N-dialkylamino radicals, and combinations thereof, wherein the carbon atoms of these latter radicals total not more than 25;

said organoaluminum compound can be represented by $R_3Al$ wherein R is a saturated aliphatic, saturated cycloaliphatic, or aromatic radical, or combination thereof, containing from one to 20 carbon atoms per R group, and wherein the mole ratio of said organocalcium reaction product to said organoaluminum compound is from about 0.2:1 to 15:1, and the concentration of said organocalcium reaction product employed in said polymerization process is in the range of from about 1.1 to 100 gram millimoles per 100 grams of monomer employed.

2. The process of claim 1 wherein in said polymerization process said hydrocarbon diluent contains four to ten carbon atoms per molecule.

3. The process of claim 1 wherein the mole ratio of said organocalcium reaction product to said organoaluminum compound is about 0.3:1 to 10:1 and wherein the concentration of said organocalcium reaction product is about 2 to 20 gram millimoles per 100 grams of monomer(s) employed.

4. The process of claim 1 wherein said organocalcium reaction product is that of calcium with anthracene or with 9,10-dimethyl anthracene; and wherein said organoaluminum compound is triisobutylaluminum.

5. The process of claim 1 wherein said polymerizable conjugated diene is 1,3-butadiene and wherein said polymerizable monovinyl-substituted aromatic compound is styrene.

* * * * *